USo09214274B2

(12) United States Patent
Herglotz et al.

(10) Patent No.: US 9,214,274 B2
(45) Date of Patent: *Dec. 15, 2015

(54) METHOD AND APPARATUS FOR TRANSMITTING SIGNALS BETWEEN A WALL AND A LEAF FASTENED TO THIS WALL USING HINGES AROUND A HINGE AXIS (75) Inventors: Tibor Herglotz, Kreuzau (DE); Ingo Steinfeld, Langenfeld (DE); Wolfgang Staude, Waldeck (DE)

(73) Assignee: DR. HAHN GMBH & CO. KG, Moenchengladbach-Wickrath (DE)

( * ) Notice: Subject to any disclaimer, the term of this patent is extended or adjusted under 35 U.S.C. 154(b) by 264 days.

This patent is subject to a terminal disclaimer.

(21) Appl. No.: 13/823,743

(22) PCT Filed: Sep. 29, 2011

(86) PCT No.: PCT/EP2011/067003
§ 371 (c)(1),
(2), (4) Date: Mar. 15, 2013

(87) PCT Pub. No.: WO2012/045659
PCT Pub. Date: Apr. 12, 2012

(65) Prior Publication Data
US 2013/0181543 A1 Jul. 18, 2013

(30) Foreign Application Priority Data

Oct. 4, 2010 (DE) .......................... 10 2010 037 943
Oct. 4, 2010 (DE) .......................... 10 2010 037 944

(51) Int. Cl.
*G08B 1/00* (2006.01)
*H01F 38/14* (2006.01)
(Continued)

(52) U.S. Cl.
CPC ............ *H01F 38/14* (2013.01); *E05D 11/0081* (2013.01); *H04B 5/0025* (2013.01);
(Continued)

(58) Field of Classification Search
CPC ......... H04N 9/24; H04N 5/228; G08B 25/06; G08B 29/04; H01F 38/14; H01F 2038/143; A61B 5/04282; D06F 39/087; E05D 11/0081; E05D 2003/025; E05D 5/14; E05D 7/0054; E05Y 2400/66; E05Y 2800/00
USPC ................. 340/531, 539.1, 540, 582, 538.11, 340/538.14, 538.16, 539.21, 539.31, 541, 340/545.1, 545.3–545.9
See application file for complete search history.

(56) References Cited

U.S. PATENT DOCUMENTS 4,292,589 A * 9/1981 Bonner .......................... 324/221
4,792,910 A * 12/1988 Lange ........................ 358/1.16

(Continued)

FOREIGN PATENT DOCUMENTS

CN 2137364 Y 6/1993
DE 30 29 543 A1 2/1982
(Continued)

*Primary Examiner* — Daniel Previl
(74) *Attorney, Agent, or Firm* — Norman B. Thot (57) ABSTRACT A method for transmitting a signal between a wall and a leaf hinged to the wall around an articulation axis includes providing a first signal transmission coil comprising a face side on the wall or on the leaf. A second signal transmission coil comprising a face side is provided on the wall or on the leaf. A carrier voltage is modulated via the signal to be transmitted so as to obtain a modulated carrier voltage. The modulated carrier voltage is applied to the first signal transmission coil so as to generate a secondary voltage modulated by the signal to be transmitted in the second signal transmission coil via an inductive coupling. The first signal transmission coil and the second signal transmission coil are arranged symmetrically with respect to the articulation axis and to face each another on their respective face sides.

30 Claims, 4 Drawing Sheets (51) Int. Cl.
- *E05D 11/00* (2006.01)
- *H04B 5/00* (2006.01)
- *E05D 5/14* (2006.01)
- *E05D 7/00* (2006.01)
- *E05D 3/02* (2006.01)

(52) U.S. Cl.
CPC ............... *E05D 5/14* (2013.01); *E05D 7/0054* (2013.01); *E05D 2003/025* (2013.01); *E05Y 2400/66* (2013.01); *E05Y 2800/00* (2013.01)

(56) References Cited

U.S. PATENT DOCUMENTS

| | | | | |
|---|---|---|---|---|
| 5,219,386 | A | * | 6/1993 | Kletzmaier et al. ............ 70/277 |
| 5,563,948 | A | * | 10/1996 | Diehl et al. .................... 380/229 |
| 5,821,632 | A | * | 10/1998 | Normann et al. ............ 307/10.1 |
| 6,510,517 | B1 | | 1/2003 | Bruhnke et al. |
| 8,928,477 | B2 | * | 1/2015 | Herglotz et al. ........... 340/539.1 |
| 2003/0018893 | A1 | | 1/2003 | Hess et al. |
| 2004/0216957 | A1 | * | 11/2004 | Hansl et al. .................. 187/247 |
| 2005/0193930 | A1 | | 9/2005 | Hartel et al. |
| 2005/0206240 | A1 | | 9/2005 | Enders et al. |
| 2009/0230743 | A1 | * | 9/2009 | Derakhshan et al. ......... 297/329 |
| 2010/0219183 | A1 | * | 9/2010 | Azancot et al. ............... 219/676 |
| 2011/0165862 | A1 | * | 7/2011 | Yu et al. ....................... 455/411 |

FOREIGN PATENT DOCUMENTS

| | | |
|---|---|---|
| DE | 39 15 812 A1 | 11/1990 |
| DE | 41 12 064 A1 | 10/1991 |
| DE | 43 22 811 A1 | 2/1994 |
| DE | 93 02 652 U1 | 8/1994 |
| DE | 10 2004 017 341 A1 | 1/2005 |
| EP | 0 316 872 A2 | 5/1989 |
| EP | 0 451 445 A2 | 10/1991 |
| RU | 2 161 384 C1 | 12/2000 |
| RU | 2 236 760 C2 | 9/2004 |
| RU | 2 277 369 C2 | 6/2006 |
| RU | 2005 118 539 A | 12/2006 |
| RU | 2 297 344 C2 | 4/2007 |
| RU | 2 331 098 C1 | 8/2008 |
| RU | 2 372 222 C2 | 11/2009 |
| SU | 1182547 A | 9/1985 |

* cited by examiner

METHOD AND APPARATUS FOR TRANSMITTING SIGNALS BETWEEN A WALL AND A LEAF FASTENED TO THIS WALL USING HINGES AROUND A HINGE AXIS

CROSS REFERENCE TO PRIOR APPLICATIONS

This application is a U.S. National Phase application under 35 U.S.C. §371 of International Application No. PCT/EP2011/067003, filed on Sep. 29, 2011 and which claims benefit to German Patent Application No. 10 2010 037 944.1, filed on Oct. 4, 2010, and to German Patent Application No. 10 2010 037 943.3, filed on Oct. 4, 2010. The International Application was published in German on Apr. 12, 2012 as WO 2012/045659 A1 under PCT Article 21(2).

FIELD

The present invention relates to a method and to a device for transmitting signals between a wall and a leaf hinged to this wall around an articulation axis.

BACKGROUND

Hinges, which serve to provide a hinged connection of a wing to a wall, have been described, for example, in DE 93 02 652 U1. They have proved their worth in different technical embodiments and are also used for doors for buildings such as houses and businesses or also in emergency exit doors. Particularly for comparatively heavy wings, such as house and apartment doors, the hinges are frequently in the form of so-called "three-part hinges". With these, the frame hinge part, which is usually fastened to the frame, comprises two frame articulation parts which are separated from one another in the direction of the articulation axis leaving a gap between them. The wing hinge part comprises a wing articulation part which engages in the gap in line with the frame articulation parts. A hinge pin, which defines the articulation axis, passes through the articulation parts.

To an increasing extent, comparatively heavy doors in particular have devices which improve security or convenience, the current operating state of which is continuously monitored by a monitoring device which is arranged outside the door and which transmits changes in operating state or possibly signals received from sensors to the monitoring device.

An intrusion alarm unit installed in a building which communicates with devices provided on the door, such as opening, break-through, locking, sabotage or motorized lock monitoring, is mentioned here by way of example.

Multi-core cables, which are flexibly laid between the wing and the frame and are frequently enclosed by a flexible metal tube for protection, are used in the prior art to transmit appropriate signals bidirectionally between the monitoring device and the devices located on the door.

These cable transitions detract considerably from the visual appearance and may become trapped when the wing is closed, which can lead to damage or even to the destruction of the cables. The cable transitions also constitute weak points with regard to possible tampering, on account of which additional security or monitoring measures with regard to a possible severing of the cables must be taken.

A hinge with an integral transformer for contactless energy transmission is described in DE 10 2004 017 341 A1. This hinge comprises a primary coil arranged in a frame hinge part and a secondary coil arranged in a wing hinge part. The magnetic coupling of the secondary coil to the primary coil, which are spaced apart from one another in the direction of the articulation axis, is achieved by an iron core which passes through both coils and at the same time forms the hinge pin. Tests have shown that low electrical powers can be transmitted from the primary to secondary side with the hinge described in DE 10 2004 017 341 A1.

SUMMARY

An aspect of the present invention is to provide a method and a device for the non-contact transmission of signals between a wall and a leaf hinged to this wall around an articulation axis.

In an embodiment, the present invention provides a method for transmitting a signal between a wall and a leaf hinged to the wall around an articulation axis which includes providing a first signal transmission coil comprising a face side on the wall or on the leaf. A second signal transmission coil comprising a face side is provided on the wall or on the leaf. A carrier voltage is modulated via the signal to be transmitted so as to obtain a modulated carrier voltage. The modulated carrier voltage is applied to the first signal transmission coil so as to generate a secondary voltage modulated by the signal to be transmitted in the second signal transmission coil via an inductive coupling. The first signal transmission coil and the second signal transmission coil are arranged symmetrically with respect to the articulation axis and to face each another on their respective face sides.

BRIEF DESCRIPTION OF THE DRAWINGS

The present invention is described in greater detail below on the basis of embodiments and of the drawings in which.

DETAILED DESCRIPTION

The method according to the present invention for transmitting signals between a wall and a leaf hinged to this wall around an articulation axis provides that a carrier voltage modulated by the signal to be transmitted is applied to a first coil arranged on the wall or on the leaf in order to generate a secondary voltage modulated by the transmitted signal in a second coil arranged on the leaf or on the wall by means of inductive coupling. As the signal is to be transmitted bidirectionally, i.e., both from the wall to the wing and from the wing to the wall, depending on the transmission direction, both the coil arranged on the wall and the coil arranged on the wing can be the first coil. Accordingly, the other coil in each case then acts as the second coil.

A significant advantage of the method according to the present invention is that the signal transmission takes place without a cable transition between wall or frame and wing. The first and second coil only have to be fitted in an arrangement which can be swiveled about the articulation axis and which ensures an inductive coupling of the two coils so that the carrier voltage modulated by the signal to be transmitted which is applied to the first coil induces a secondary voltage in the second coil, which enables the signal to be reproduced by demodulation.

The carrier voltage can conceivably be modulated in any manner which is known for signal transmission, in particular frequency or amplitude modulation.

In an embodiment of the present invention, the carrier voltage can, for example, be modulated by the signal amplitudes because digital signals can in this way also be easily transmitted bidirectionally.

In an embodiment of the present invention, the carrier voltage can, for example, be a sinusoidal alternating voltage with a carrier frequency of at least 20 kHz. It has been shown that, on the one hand, carrier voltages of this kind provide an inductive coupling of the first and second coils which is usually adequate for transmitting signals between wall and wing and, on the other also enable digital (binary) data packets to be transmitted by amplitude modulation with cycle times <150 ms at transmission rates of 9600 baud.

Tests have shown that carrier frequencies of about 100 kHz are particularly suitable for transmitting signals with the help of frequency or amplitude modulation.

In order to protect personnel against electric shock without requiring special safety measures for this purpose, the carrier voltage is a maximum of 48 V RMS.

As already mentioned above, signals can, for example, be transmitted bidirectionally, i.e., both the coil arranged on the wall and the coil arranged on the wing can be the primary coil to which the signal-modulated carrier voltage is applied.

In order to avoid interference with transmitted data packets during the bidirectional transmission, signal packets can, for example, be transmitted with a maximum length of 50 ms.

The devices arranged in the wing, which are to be monitored or controlled, continuously require electrical power which is provided by a mains connection or some other suitable device located on the wall. This electrical power can, for example, be transmitted from the wall to the wing in that the electrical power is provided in a primary voltage with a primary frequency which is suitable for applying to a primary coil provided on the wall in order to generate a secondary power voltage in a secondary coil provided on the wing by inductive coupling.

Basically, it is also possible to use the coil which is arranged on the wall and is used for signal transmission as the primary coil, and accordingly the coil which is arranged on the wing and is used for signal transmission as the secondary coil. However, tests have shown that, in particular, the need for bidirectional signal transmission can cause problems when transmitting power simultaneously with the same coils. The devices on the wing side can also cause interference pulses or phase shifts which can interfere with the signal transmission. The primary and secondary coils, which are different from the first and second coil, can, for example be used for transmitting the electrical power provided on the wall side for operating the devices provided on the wing.

In an embodiment of the present invention, the primary voltage can, for example, be a sinusoidal alternating voltage with a frequency of at least 20 kHz, for example, about 75 kHz. Tests have shown that, when using coils of a size which can be accommodated in articulating parts of the hinge mentioned in the introduction, primary voltages of this frequency enable an electrical power of 10 W and above to be transmitted at a maximum primary voltage of 48 V.

The device according to the present invention for transmitting signals between a wall and a leaf hinged to this wall around an articulation axis comprises a wall part which can be attached to the wall, a wing part which can be attached to the wing, a first coil provided on the wall part and a second coil provided on the wing. The first and second coils are actively inductively connected to one another. A primary electronics unit, which is actively connected to the first coil, i.e., usually galvanically connected, is provided on the wall side. The primary electronics unit comprises means for applying a carrier voltage to the first coil and means for modulating the carrier voltage by signals to be transmitted. A secondary electronics unit, which is actively connected to the second coil, usually galvanically connected, and which contains means for demodulating the signals of the voltage induced in the second coil, is provided on the wing. Signals can be transmitted from the wall to the wing with this device.

In order to enable the required bidirectional signal transmission, i.e., also the transmission of signals from the wing to the wall, the secondary electronics unit can, for example, have means for applying a carrier voltage to the second coil and means for modulating the carrier voltage by signals to be transmitted, and correspondingly the primary electronics unit has means for demodulating the signals of a voltage induced in the first coil.

In an embodiment of the present invention, the first and second coils can, for example, be of the same design. This saves production and storage costs and simplifies the concept of the primary and secondary electronics units.

In an embodiment of the present invention, the first and second coil can, for example, be designed for carrier frequencies of at least 20 kHz, preferably of about 100 kHz, so that coils of this kind provide a substantially unadulterated transformation of signals with coil dimensions which allow them to be accommodated in articulating parts of hinges mentioned in the introduction.

In order to prevent personnel being able to electrocute themselves in the event of technical faults or also due to carelessness during installation and maintenance, the first and second coils can, for example, be designed for carrier frequency voltages of up to 48 V RMS.

For use in a three-part hinge mentioned in the introduction, particularly suitable first and second coils in each case have a coil winding with 10 to 1000 turns of a coil wire with a diameter between 0.1 and 2.0 mm made of copper material. Finish cast, these coils have outside diameter of about 25 mm and an inside diameter of about 8 mm.

In an embodiment of the present invention, the device can, for example, additionally have a primary coil provided on the wall and a secondary coil which is actively inductively connected to the primary coil, wherein the primary coil and the secondary coil are designed and arranged in such a way that a primary voltage applied to the primary coil induces an electrical voltage in the secondary coil with a power which is suitable for operating electrical consumers which are provided on the wing. In the conception of the primary and secondary coil, it is then no longer necessary to pay attention to their suitability for a transmission of signals which is as unadulterated as possible, and they can be optimized for an energy transmission which is as low-loss as possible.

The device improved in this way, which is used both for power and signal transmission, can comprise two hinge arrangements. The first and second coil are then arranged in the one hinge arrangement, and the primary and secondary coil in the other hinge arrangement.

In an embodiment of the present invention, the device can, for example, comprise a hinge arrangement which has a first hinge arm with two first articulating parts which are spaced apart from one another in the direction of the articulation axis, and a second hinge arm with a second articulation part which engages in the gap between the two first articulating parts, and a hinge pin which at least partially passes through the articulating parts and defines the articulation axis. The first signal transmission coil is arranged on the one of the first articulating parts and the second transmission coil on the side of the second articulating part facing this first articulating part. The primary coil is arranged on the other of the first articulating parts and the secondary coil on the side of the second articulating part facing this other first articulating part. With this "three-part" hinge arrangement, both the coil pair which is used for signal transmission and that which is used for power transmission can be arranged in the hinge. In doing so, it is of advantage that the coil pair used for signal transmission can usually have smaller dimensions than the coil pair used for power transmission, so that the articulating parts are mechanically more stable in the regions in which the signal transmission coil is fitted and can be designed to be suitable for transmitting mechanical forces between the wing and the wall if this appears to be advantageous or necessary for the particular application.

Tests have shown that powers of up to 10 W at a maximum primary voltage of 48 V RMS can be achieved with coils which have ten to one hundred turns of a coil wire of between 0.5 mm and 2.0 mm diameter made of copper material as the primary and secondary coils. In the cast state, these coils have an outside diameter of 25 mm and an inside diameter of 8 mm.

For the purpose of an inductive coupling which is as good as possible, on the one hand, the signal transmission coils and, on the other the primary and secondary coil, are arranged with the facing sides at least nearly resting against one another. To improve the inductive coupling, the hinge pin can have a sleeve comprising ferromagnetic or ferrimagnetic material in the regions in which it is radially encompassed by the signal transmission coils and, in particular, in the regions in which it is encompassed by the primary and secondary coil. Both the wall thickness of the sleeve and its material composition can be adapted to suit the particular application for the purpose of optimizing the signal or power transmission.

Tests have shown that, with carrier voltage frequencies and power voltage frequencies of about 20 to 150 kHz, a manganese-zinc-ferrite-based powder bonded by a plastic material gives good results.

The present invention is explained further below with reference to an exemplary embodiment shown in the drawings.

The device designated in the drawing as a whole by 100 is designed as a so-called three-part hinge. It comprises a frame hinge part 1, which forms a hinge part 2 of the device 100 and which is used for fastening to a fixed wall W or to a fixed frame. The frame hinge part 1 has two articulating parts 3, 4 which are spaced apart from one another in the longitudinal direction of an articulation axis S by a gap 5.

The articulating part 6 of a wing part 7, which in the exemplary embodiment shown in the drawing forms a wing part 8 which can be fastened to the wing F, is arranged in the gap 5 between the top articulating part 3 and the bottom articulating part 4.

The articulation axis S is defined by a hinge pin 12 which passes through the articulating parts 3, 4 and 6 in pin receptacles 9, 10 and 11. It is adjustably mounted in a known manner in the hinge pin receptacles 9, 11 of the articulating parts 3, 4 of the frame hinge part 1 at right angles to the articulation axis S with the help of bearing bushes 13, 14 which are made of a plastic material.

The mounting of the hinge pin 12 in the hinge pin receptacle 10 of the wing articulating part 6 serves as a bearing bush 15, which in turn is made of a plastic bearing material.

In the region thereof which faces the wing articulating part 6, the bearing bush 13 of the upper frame articulating part 3 has a recess 16 which is rotationally symmetrical about the articulating axis S and in which an electrical primary coil 17 is placed. It is connected to a power voltage supply 19 (see FIG. 3) with the help of two electrical connecting cables 18.

On the side facing the primary coil 17, the bearing bush 15 of the wing articulating part 6 also comprises a recess 20, in which a secondary coil, which is constructed in a manner corresponding to that of the primary coil 17, is fitted.

The secondary coil 21 is mounted in the recess 20 so that it can be moved in the direction of the articulation axis S and is supported on the bottom 23 of the recess 20 by means of a spring element 22 so that the facing sides 24, 25 of the primary and the secondary coil 17, 21 rest against one another.

The primary and secondary coils 17, 21 have an outside diameter which corresponds approximately to the inside diameter of the pin receptacles 13, 15. This enables the dimensions of the cross-sectional area specified by the upper frame articulating part 3 and the wing articulating part 6 to be utilized by the primary and secondary coil 17, 21 in the best possible way in order to maximize the electrical power which can be inductively transmitted by the primary coil 17 to the secondary coil 21.

For the purpose of improving the coupling of primary and secondary coil 17, 21, the hinge pin 12 has a constriction 26 over the length covered by the primary and secondary coil 17, 21. A manganese-zinc powder is introduced into this constriction and immovably bonded to a sleeve 41 with the help of a plastic material.

A further recess 27 which is symmetrical with the articulation axis S, is machined in the region of the wing articulating part 6 opposite the secondary coil 21. It is used to accommodate a signal transmission coil 28, which is also referred to as the "second coil". The signal transmission coil 28 is in turn mounted in the recess 27 so that it can move in the direction of the articulation axis S and is supported on the bottom 29 thereof with the help of a spring element 30.

The face 31 of the signal transmission coil 28 opposite the spring element 30 rests on a face 32 of a further signal transmission coil 34, also referred to as the "first coil", which is mounted in a corresponding recess 33. The signal transmission coil 34 is connected to a primary electronics unit 36 with the help of connecting cables 35 (see FIG. 3).

Sliding washers 37, 38 are provided between the lower frame articulating part 4 and the wing articulating part 6 in order to reduce wear caused by a swivel movement of the hinge.

Figure 1:
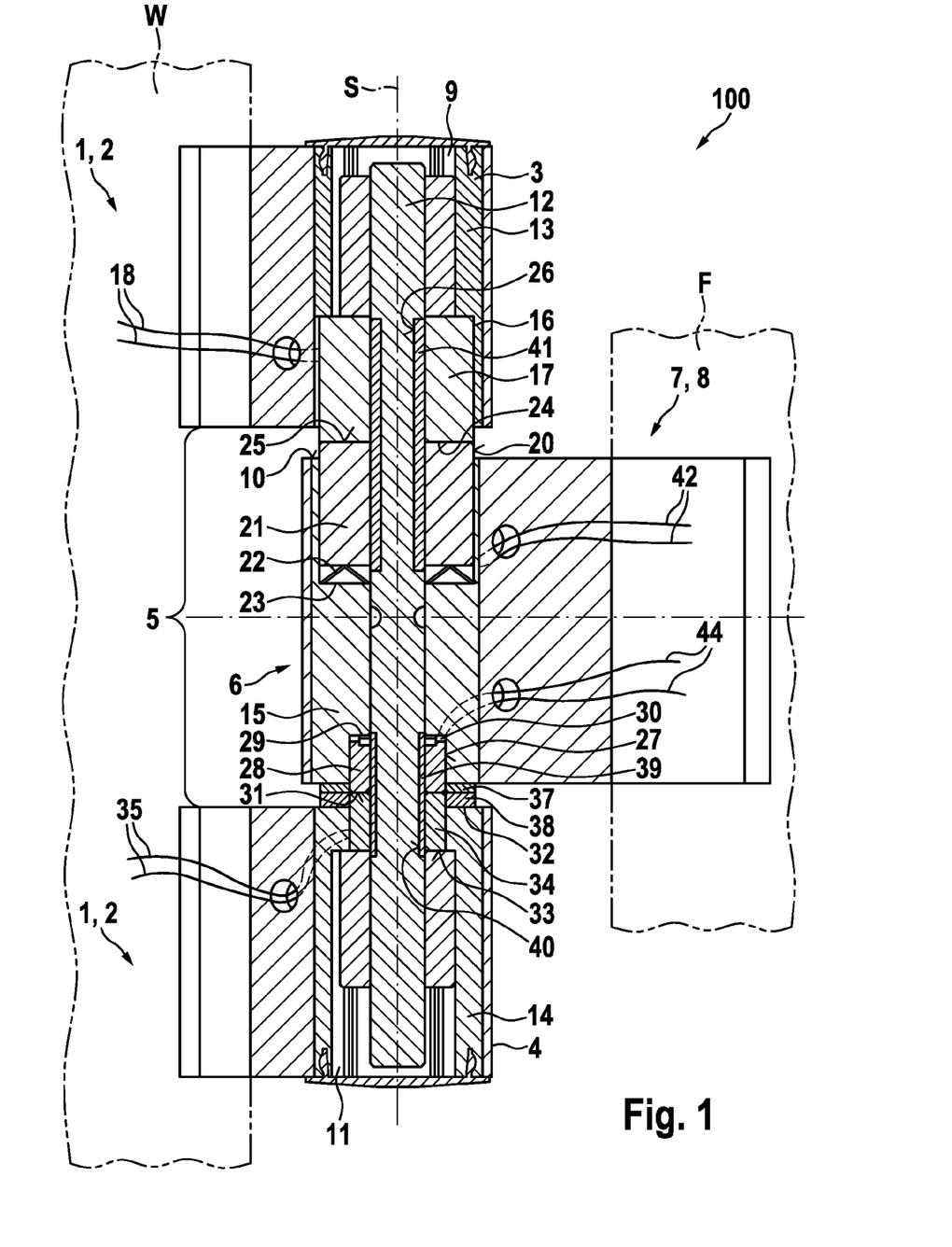
FIG. 1 shows a diagram of a longitudinal section through the articulation axis S of an exemplary embodiment of a device according to the present invention which is simultaneously assigned the function of a conventional hinge.
Figure 2:
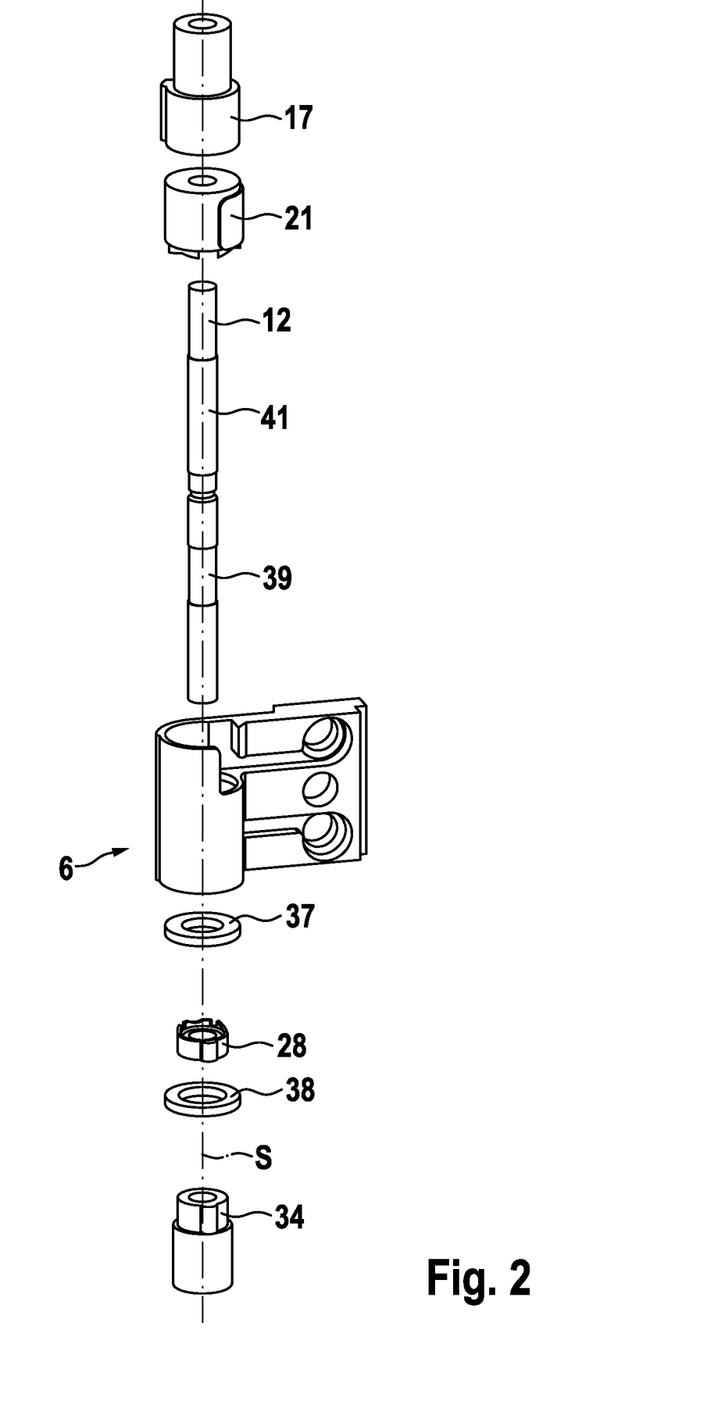
FIG. 2 shows the wing hinge part of this exemplary embodiment in a perspective exploded view which also includes renditions of the coils provided in the frame hinge part.

As can be seen particularly in FIG. 1, the signal transmission coils 28, 34 have significantly smaller dimensions than the primary and secondary coils 17, 21, as lower coil volumes are sufficient for the transmission of signals. The sleeve 39 made from a manganese-zinc-ferrite powder embedded in a plastic material, which is again provided in the overlapping region of the signal transmission coils 28, 34 in a constriction 40 of the hinge pin 12, is also equipped with a significantly smaller wall thickness, so that, overall, the region of the signal transmission coils is suitable for transmitting larger mechanical forces between the wall or frame and wing than the region of the primary and secondary coils 17, 21.

Figure 3A:
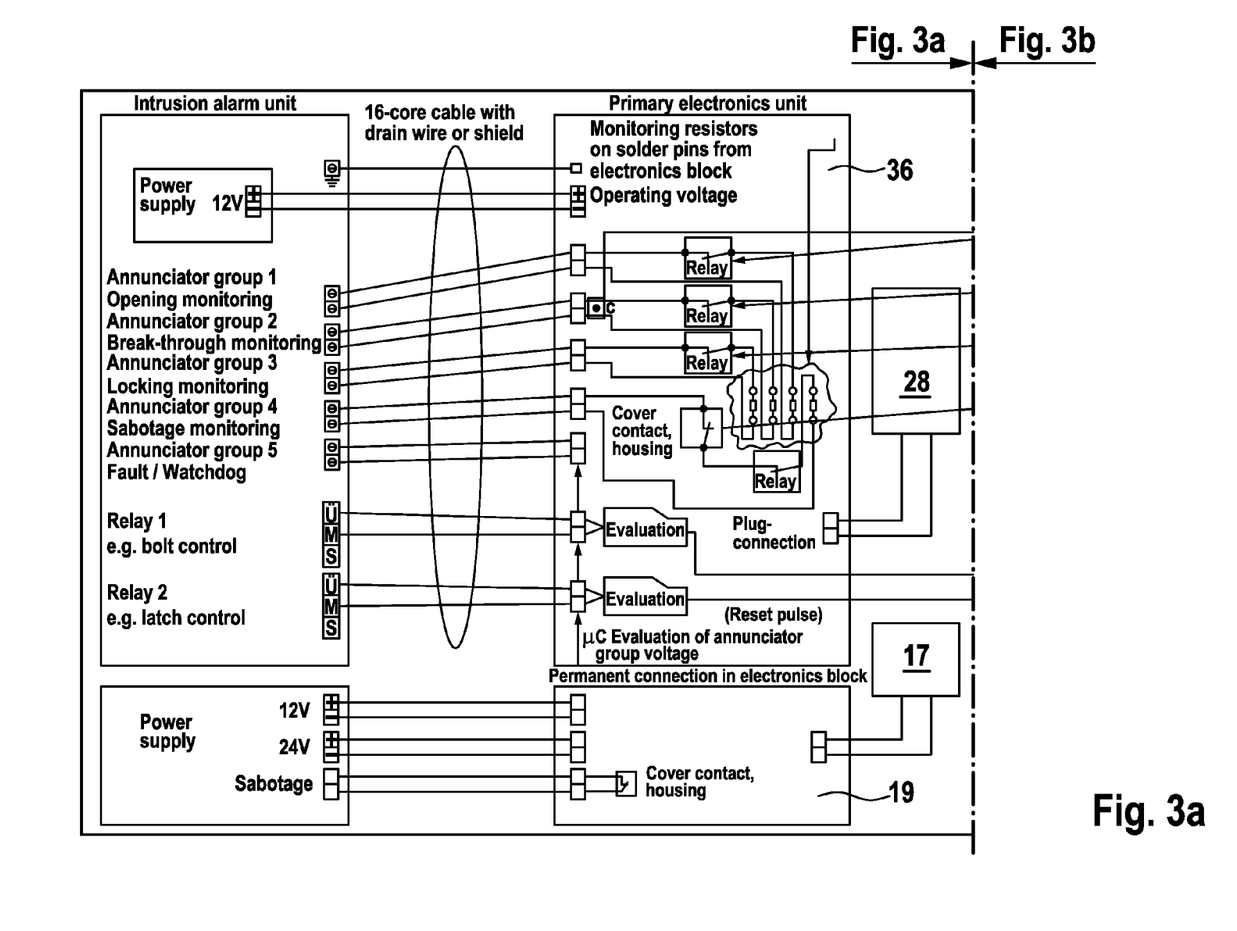
FIG. 3 shows a block circuit diagram of this device.
Figure 3B:
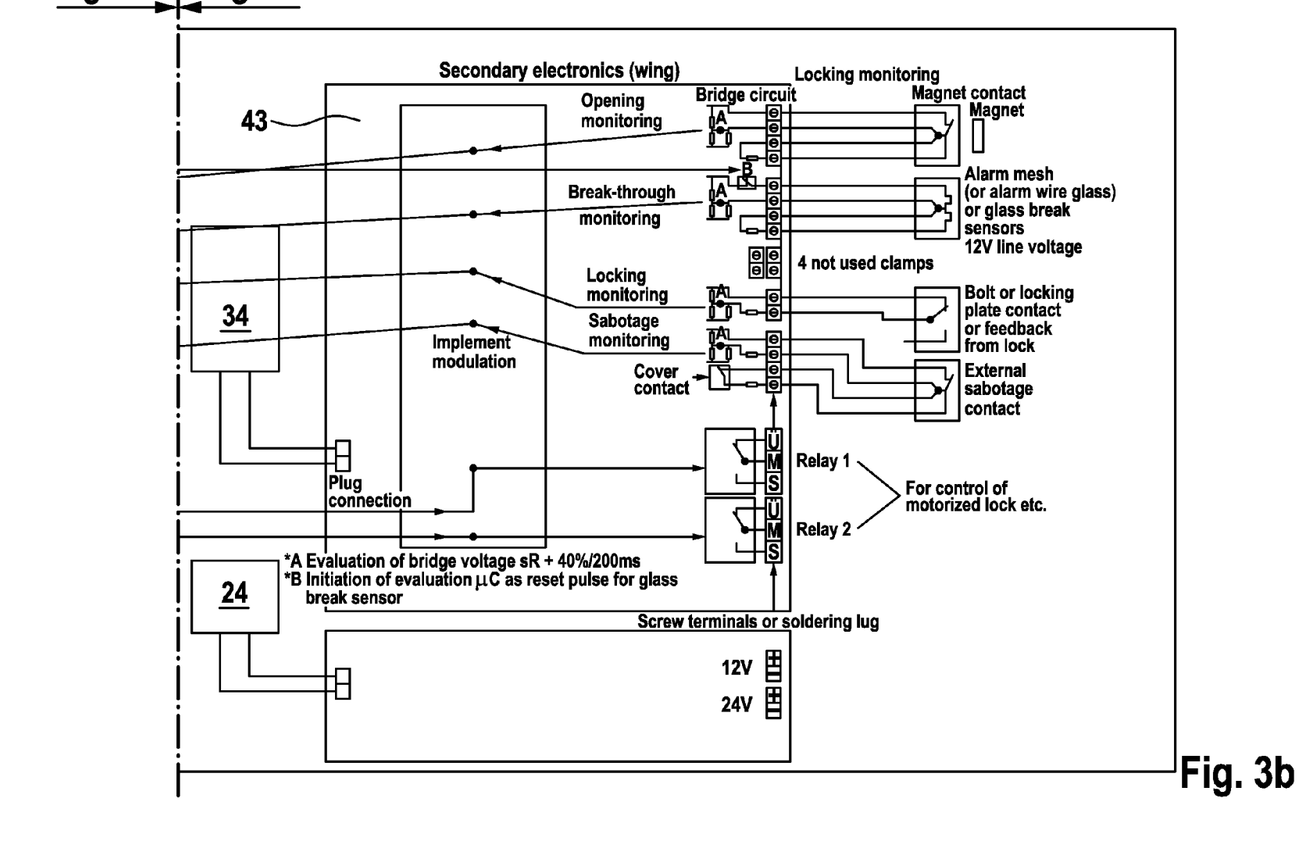

If, for example, a sinusoidal alternating voltage, which in the exemplary embodiment shown is 12 V RMS and has a frequency of 50 kHz, is now applied to the primary coil 17 via the connecting cable 18, then a roughly corresponding secondary voltage is induced in the secondary coil 24—disregarding transmission losses and phase shifts—and is fed to a secondary electronics unit 43 with the help of cables 42 (see FIG. 3). Likewise, the carrier voltage, which is also 12 V RMS and has a carrier frequency of 100 kHz and is modulated by the signals to be transmitted from the primary electronics unit 36 to the secondary electronics unit 43 and which is fed to the signal transmission coil 34 via the cable 35, will also induce a substantially corresponding secondary voltage in the signal transmission coil 34, which can be picked off via cable 44 and transmitted to the secondary electronics unit 43 for demodulation.

Both the primary electronics unit 36 and the secondary electronics unit 43 are designed for modulation as well as demodulation operation. In this way—as shown in FIG. 3 using an intrusion alarm unit as an example—secondary electronics devices located on a door wing, such as motorized locks and the like, can be supplied with the necessary electrical power via the primary and secondary coils 17, 19, wherein the voltage induced in the secondary coil 24 is transformed to the required voltage values on the secondary side. Further, signals modulated by means of the signal transmission coils 28, 34 using protocols which comply with the RS 485 standard for example are inductively transmitted, for example for interrogating an opening, break-through, locking or sabotage monitoring system, via the signal transmission coil 34 to the secondary electronics unit where they are demodulated and fed to the appropriate monitoring devices, whereupon these signals, which reproduce the respective functional state, are fed to the intrusion alarm unit after modulation by the secondary electronics unit, transmission with the help of the signal transmission coils 28, 34 and demodulation by the primary electronics unit 36.

Further, certain signal sequences which characterize the orderly operating state of both the primary and the secondary electronics units can be periodically exchanged between the primary and the secondary electronics unit at short time intervals. The intrusion alarm unit can then be configured in such a way that an alarm is initiated if irregularities in these periodic signal sequences indicate malfunctions.

The present invention is not limited to embodiments described herein; reference should be had to the appended claims.

LIST OF REFERENCES

100 Device
1 Frame hinge part
2 Hinge part
3 Articulating part
4 Articulating part
5 Gap
6 Articulating part
7 Wing hinge part
8 Wing part
9 Pin receptacle
10 Pin receptacle
11 Pin receptacle
12 Wall pin
13 Bearing bush
14 Bearing bush
15 Bearing bush
16 Recess
17 Primary coil
18 Connecting cable
19 Power voltage supply
20 Recess
21 Secondary coil
22 Spring element
23 Bottom
24 Face
25 Face
26 Constriction
27 Recess
28 Signal transmission coil
29 Bottom
30 Spring element
31 Face
32 Face
33 Recess
34 Signal transmission coil
35 Connecting cable
36 Primary electronics unit
37 Sliding washer
38 Sliding washer
39 Sleeve
40 Constriction
41 Sleeve
42 Cable
43 Secondary electronics unit
44 Cable
F Wing
S Articulation axis
W Wall

What is claimed is:

1. A method for transmitting a signal between a wall and a leaf hinged to the wall around an articulation axis, the method comprising:
providing a first signal transmission coil comprising a face side on the wall or on the leaf;
providing a second signal transmission coil comprising a face side on the wall or on the leaf;
modulating a carrier voltage via the signal to be transmitted so as to obtain a modulated carrier voltage; and
applying the modulated carrier voltage to the first signal transmission coil so as to generate a secondary voltage modulated by the signal to be transmitted in the second signal transmission coil via an inductive coupling,
wherein the first signal transmission coil and the second signal transmission coil are each arranged on the articulation axis and to face each another on their respective face sides.

2. The method as recited in claim 1, wherein the modulating of the carrier voltage by the signal is at least one of a frequency-modulation and a phase-modulation.

3. The method as recited in claim 1, wherein the modulating of the carrier voltage by the signal is an amplitude-modulation.

4. The method as recited in claim 1, wherein the carrier voltage is a sinusoidal alternating voltage with a carrier frequency of at least 20 kHz.

5. The method as recited in claim 4, wherein the carrier frequency is about 100 kHz.

6. The method as recited in claim 4, wherein the carrier frequency has a maximum voltage of 12 V RMS.

7. The method as recited in claim 1, wherein the signal is transmitted bidirectionally.

8. The method as recited in claim 7, wherein the signal comprises signal packets with a maximum length of 40 ms.

9. The method as recited in claim 1, further comprising:
providing a primary coil arranged on the wall;
providing a secondary coil arranged on the wing;
providing an electrical power on a wall side;
providing the electrical power in a primary voltage with a primary frequency which is suitable for applying to the primary coil arranged on the wall so as to generate a secondary power voltage in the secondary coil arranged on the wing via an inductive coupling; and thereby transmitting the electrical power from the wall to the wing.

10. The method as recited in claim 9, wherein the primary coil and the secondary coil are each a signal transmission coil.

11. The method as recited in claim 9, wherein the primary coil and the secondary coil are a different coil distinct from a signal transmission coil.

12. The method as recited in claim 9, wherein the primary voltage has a frequency of at least 20 kHz.

13. The method as recited in claim 12, wherein the frequency is about 50 kHz.

14. The method as recited in claim 12, wherein the primary voltage is a sinusoidal alternating voltage.

15. A device for transmitting signals between a wall and a leaf hinged to the wall around an articulation axis, the device comprising:
a wall part fastened to the wall;
a wing part fastened to the wing;
a first signal transmission coil comprising a face side arranged on the wall part;
a second signal transmission coil comprising a face side arranged on the wing part,
a primary electronics unit arranged on the wall side, the primary electronics unit being actively connected to the first signal transmission coil, the primary electronics unit comprising a carrier voltage device configured to apply a carrier voltage to the first signal transmission coil and a carrier voltage modulating device configured to modulate the carrier voltage by the signals to be transmitted; and
a secondary electronics unit arranged on the wing, the secondary electronics unit being actively connected to the second signal transmission coil, the secondary electronics unit comprising a demodulating voltage device configured to demodulate a voltage induced in the second signal transmission coil,
wherein the first signal transmission coil and the second signal transmission coil are actively inductively connected to each another so as to be arranged symmetrically with respect to the articulation axis and to face one another on their respective face sides.

16. The device as recited in claim 15, wherein
the secondary electronics unit further comprises a carrier voltage device configured to apply a carrier voltage to the second signal transmission coil and a carrier voltage modulating device configured to modulate the carrier voltage by the signals to be transmitted, and
the primary electronics unit further comprises a demodulating voltage device configured to demodulate the signals of a voltage induced in the first signal transmission coil.

17. The device as recited in claim 15, wherein the first signal transmission coil and the second signal transmission coil are of the same design.

18. The device as recited in claim 15, wherein the first signal transmission coil and the second signal transmission coil are each configured to transmit carrier frequencies of at least 20 kHz.

19. The device as recited in claim 18, wherein the carrier frequencies are about 100 kHz.

20. The device as recited in claim 15, wherein the first signal transmission coil and the second signal transmission coil are each configured for carrier frequency voltages of up to 12 V.

21. The device as recited in claim 15, wherein the first signal transmission coil and the second signal transmission coil each further comprise a coil winding comprising from 10 to 1,000 turns of a coil wire having a diameter of between 0.1 and 2.0 mm and comprising a copper material.

22. The device as recited in claim 15, further comprising:
a primary coil arranged on the wall;
a secondary coil which is actively inductively connected to the primary coil; and
an electrical consumer arranged on the wing;
wherein the primary coil and the secondary coil are configured and arranged so that a primary voltage applied to the primary coil induces an electrical voltage in the secondary coil with a power sufficient to operate the electrical consumer.

23. The device as recited in claim 22, further comprising:
a first hinge arrangement comprising the first signal transmission coil and the second signal transmission coil; and
a second hinge arrangement comprising the primary coil and the secondary coil to transmit the power.

24. The device as recited in claim 22, further comprising a hinge arrangement comprising:
a first hinge arm with two first articulating parts which are spaced apart so that a gap is arranged between the two first articulating parts in a direction of the articulation axis,
a second hinge arm with a second articulating part configured to engage in the gap between the two first articulating parts, and
a hinge pin defining the articulation axis, the hinge pin being configured to at least partially pass through the two first articulating parts and through the second articulating part,
wherein the second signal transmission coil is arranged on one of the two first articulating parts and the first signal transmission coil is arranged on a side of the second articulating part facing the one of the two first articulating parts, and
wherein the primary coil is arranged on the other of the two first articulating parts and the secondary coil is arranged on a side of the second articulating part facing the other of the two first articulating parts.

25. The device as recited in claim 24, wherein the hinge pin comprises a sleeve, wherein the sleeve comprises a ferrimagnetic material or a ferromagnetic material in regions where the sleeve is radially encompassed by the first signal transmission coil and by the second signal transmission coil.

26. The device as recited in claim 25, wherein the sleeve comprises a ferrimagnetic material or a ferromagnetic material in regions where the sleeve is radially encompassed by the primary coil and by the secondary coil.

27. The device as recited in claim 25, wherein the sleeve comprises a manganese-zinc-ferrite powder bonded by a plastic material.

28. The device as recited in claim 22, wherein the primary coil and the secondary coil are each configured for maximum alternating voltages of 48 V RMS and maximum frequencies of 100 kHz.

29. The device as recited in claim 22, wherein the primary coil and the secondary coil each comprise a coil winding comprising from 10 to 1,000 turns of a coil wire having a diameter of between 0.1 and 2.0 mm and comprising a copper material.

30. The device as recited in claim 22, wherein,
the first signal transmission coil and the second signal transmission coil are arranged so that their respective face sides almost rest against one another, and the primary coil and the secondary coil each comprise a face side, the primary coil and the secondary coil being arranged so that their respective face sides almost rest against one another.

* * * * *